United States Patent
Gramann et al.

(10) Patent No.: US 9,051,974 B2
(45) Date of Patent: Jun. 9, 2015

(54) HYDROSTATIC CLUTCH ACTUATOR

(75) Inventors: Matthias Gramann, Renchen (DE); Markus Kneissler, Buehlertal (DE); Julian Botiov, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 174 days.

(21) Appl. No.: 13/457,000

(22) Filed: Apr. 26, 2012

(65) Prior Publication Data

US 2012/0217117 A1 Aug. 30, 2012

Related U.S. Application Data

(63) Continuation of application No. PCT/DE2010/001183, filed on Oct. 7, 2010.

(30) Foreign Application Priority Data

Oct. 29, 2009 (DE) .......... 10 2009 051 244
Feb. 25, 2010 (DE) .......... 10 2010 009 297

(51) Int. Cl.
*F15B 7/08* (2006.01)
*F16D 29/00* (2006.01)

(52) U.S. Cl.
CPC ............. *F16D 29/005* (2013.01); *F15B 7/08* (2013.01)

(58) Field of Classification Search
CPC .......... B60T 13/745; F15B 7/005; F15B 7/08; F16D 29/005
USPC ................ 60/585, 545, 588; 92/136
See application file for complete search history.

(56) References Cited

U.S. PATENT DOCUMENTS

| | | | | |
|---|---|---|---|---|
| 4,858,436 A | * | 8/1989 | Brusasco | 60/545 |
| 4,893,473 A | * | 1/1990 | Hool et al. | 60/589 |
| 4,924,673 A | * | 5/1990 | Barker et al. | 60/585 |
| 5,284,017 A | * | 2/1994 | Kopacin | 60/585 |
| 6,102,828 A | * | 8/2000 | MacKenzie | 92/136 |
| 6,230,492 B1 | * | 5/2001 | Kingston et al. | 92/136 |
| 6,510,780 B1 | * | 1/2003 | Eden et al. | 92/136 |
| 2006/0228236 A1 | | 10/2006 | Krisher | |

FOREIGN PATENT DOCUMENTS

CN 1329697 A 1/2002

* cited by examiner

*Primary Examiner* — F. Daniel Lopez
(74) *Attorney, Agent, or Firm* — Simpson & Simpson, PLLC

(57) ABSTRACT

A hydrostatic actuator, in particular, a hydrostatic clutch actuator, having a master cylinder including a housing and a piston that is axially displaceable in the housing and applies pressure to a pressure chamber, a gearing mechanism converting a rotary drive into an axial movement, and an electric motor driving the gearing mechanism to rotate and including a stator and a rotor, where the pressure chamber is arranged axially between the piston and the electric motor with respect to an axis of rotation of the electric motor.

12 Claims, 4 Drawing Sheets

HYDROSTATIC CLUTCH ACTUATOR

CROSS-REFERENCE TO RELATED APPLICATIONS

This patent is filed under 35 U.S.C. §120 and §365(c) as a continuation of International Patent Application No. PCT/DE2010/001183 filed Oct. 7, 2010, which application claims priority from German Patent Application No. 10 2009 051 244.6 filed Oct. 29, 2009, and German Patent Application No. 10 2010 009 297.5 filed Feb. 25, 2010, which applications are incorporated herein by reference in their entireties.

FIELD OF THE INVENTION

The invention broadly relates to a hydrostatic actuator and, more particularly, to a hydrostatic clutch actuator' with a master cylinder that includes a housing and a piston that is axially displaceable in the housing and applies pressure to a pressure chamber, with a gearing mechanism converting a rotary drive into an axial movement, and with an electric motor that rotationally drives the gearing mechanism and includes a stator and a rotor.

BACKGROUND OF THE INVENTION

German Patent No. 197 00 935 A1 discloses a hydrostatic actuator of this type in the form of a hydrostatic clutch actuator. In accordance with this document, a piston of a master cylinder is driven by an electric motor and the rotary movement of the electric motor is converted into an axial movement by a gearing mechanism in the form of a worm drive. The piston is driven by an eccentric pin arranged on the worm gear.

BRIEF SUMMARY OF THE INVENTION

An object of the invention is to improve and further develop hydrostatic actuators of this kind, for example, in terms of increasing their efficiency, reducing the required installation space, and increasing the operating pressure of the master cylinder.

An object of the invention is attained by a hydrostatic actuator, for example, a hydrostatic clutch actuator, comprising a master cylinder with a housing and with a piston that is axially movable in the housing and applies pressure to a pressure chamber, a gearing mechanism for converting a rotary drive into an axial movement, and an electric motor rotationally driving the gearing mechanism and including a stator and a rotor, the piston being arranged axially between the pressure chamber and electric motor with respect to an axis of rotation of the electric motor.

Another object of the invention is alternatively attained by a hydrostatic actuator, for example, a hydrostatic clutch actuator including a master cylinder with a housing and with a piston that is axially movable in the housing and applies pressure to a pressure chamber, a gearing mechanism for converting a rotary drive into an axial movement, and an electric motor rotationally driving the gearing mechanism and including a stator and a rotor, the piston being arranged axially between piston and electric motor. If such an arrangement is used, the housing of the master cylinder is loaded in the direction of the electric motor when the pressure chamber is compressed by the piston. The piston is pulled against the electric motor as the gearing mechanism exerts a tractive force on the piston. For instance, a gear spindle of the gearing mechanism may be connected to the piston in one piece. In this context, the piston is preferably an annular piston that moves in a pressure chamber of annular design.

In addition to being used to operate a friction clutch, the proposed hydrostatic actuators may be used for other types of motions especially in a motor vehicle in which strong forces need to be transmitted by a relatively small electric motor. Such types of motions include, but are not limited to, the operation of brakes such as service brakes and emergency brakes, the operation of gearing mechanisms, park brakes, the operation of doors and flaps, and the like.

Suitable gearing mechanisms are spindle gearing mechanisms, including a spindle that axially drives the piston and is selectively connected to the latter in one piece and a spindle nut that may be formed by a sleeve that may be directly driven by the rotor of the electric motor or may be formed thereof. Moreover, to reduce friction, in one embodiment the spindle may be a recirculating ball screw. In another embodiment, the gearing mechanism may be a planetary rolling contact gearing, including a threaded spindle that is arranged along the axis of rotation and axially moves the piston, a rotationally driven sleeve arranged coaxially with the spindle, and planetary gears rolling off there between as disclosed, for example, generally in European Patent No. 0 320 621 A1. When using a planetary rolling contact gearing, due to its high gear ratio, a high-revolution electric motor of relatively low power may be used.

To reduce the axial installation space, the gearing mechanism, such as a planetary rolling contact gearing, may be arranged radially inside the rotor. The rotor may be arranged on the gearing mechanism, for example, on the sleeve of the planetary rolling contact gearing. The entire gearing mechanism may be arranged in the installation space of the rotor. The functions of the rotor and the sleeve may be combined with each other. For instance, a sheet metal structure of the rotor may be dispensed by arranging the permanent magnets of the rotor directly on the sleeve, for example, by gluing them onto the sleeve. Moreover, the gearing mechanism may be integrated into the rotor, if for instance, the rotor forms the interior toothing of the planets of a planetary rolling contact gearing.

To achieve compact hydrostatic actuators, the components or assemblies of the hydrostatic actuator may nestle within each other. For instance, a master cylinder housing section forming the pressure chamber may be arranged radially outside the gearing mechanism and the electric motor may be arranged axially adjacent to the pressure chamber. In this context, the electric motor has a smaller diameter than the outer diameter of the pressure chamber, i.e., of the housing section that forms the pressure chamber.

In one embodiment, a compensation reservoir for a hydrostatic pressure fluid may be integrated into the hydrostatic actuator in a way that requires no additional installation space, i.e., in an installation space defined by the electric motor, the gearing mechanism and the housing of the master cylinder and preferably arranged cylindrically about an axis of rotation of the electric motor.

The compensation reservoir may be connected to the pressure chamber by what is known as a compensation orifice, which is connected to the pressure chamber in the relaxed state of the piston and is closed by the piston when pressure is applied to the pressure chamber. In the installed state with the compensation reservoir arranged above the pressure chamber, there may be a pressure balance between the compensation reservoir and the environment so the pressure fluid will flow in hydrostatically, or the compensation reservoir may preloaded by means of a membrane, such as a bellows or a coil spring, for the pressure fluid to flow in into the pressure chamber under slight overpressure as required.

In one embodiment, the compensation reservoir is arranged radially inside the pressure chamber of annular design, for instance in the installation space left clear by the piston rod and the interior diameter of the housing of the master cylinder. The piston rod or a threaded spindle of the gearing mechanism that is firmly connected to the piston rod or designed as one piece with the latter may at least partially axially engage the compensation reservoir during a displacement of the piston.

In another embodiment, the compensation reservoir may be arranged radially outside an annular pressure chamber. The diameter of the compensation reservoir may be limited radially to the outer diameter of the electric motor or of any other component that predetermines the diameter of the hydrostatic actuator for reasons of available installation space.

To seal off the master cylinder against any leakage to the outside, a leakage seal, such as a lip seal or a bellows, may be provided between the housing and the piston. Alternatively, a leakage seal may be arranged between the housing and the gearing mechanism and/or between a threaded spindle of the gearing mechanism and the housing.

In one embodiment, the housing of the master cylinder and the sleeve of the planetary rolling contact gearing may be of one-piece construction, for instance of drawn sheet-metal. The master cylinder and the planetary rolling-contact gear system may be an assembly unit.

In the hydrostatic actuator, a sensor device is provided that at least senses the rotary movement of the electric motor and provides data for the commutation of the electric motor, which is preferably a brushless electric motor. In addition, additional sensors or the sensors provided in the sensor device may detect and determine the axial path of the piston. Moreover, the sensor device may be used to determine the slip of the planetary rolling-contact gear system. The data is read into a control device of the hydrostatic actuator and is processed therein. The sensor device may transmit the signals directly to the control device or it may be equipped with local electronics for preprocessing corresponding signals and transmitting them to the control device after conversion. The control device may be integrated into the hydrostatic actuator, for instance in the electric motor, or may be arranged on the hydrostatic actuator. The sensor device may be arranged on the end face opposite the end face that receives the housing of the master cylinder. Alternatively, the sensor device may be arranged on the end face that receives the housing of the master cylinder, for example, between the housing of the master cylinder and the housing of the electric motor.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
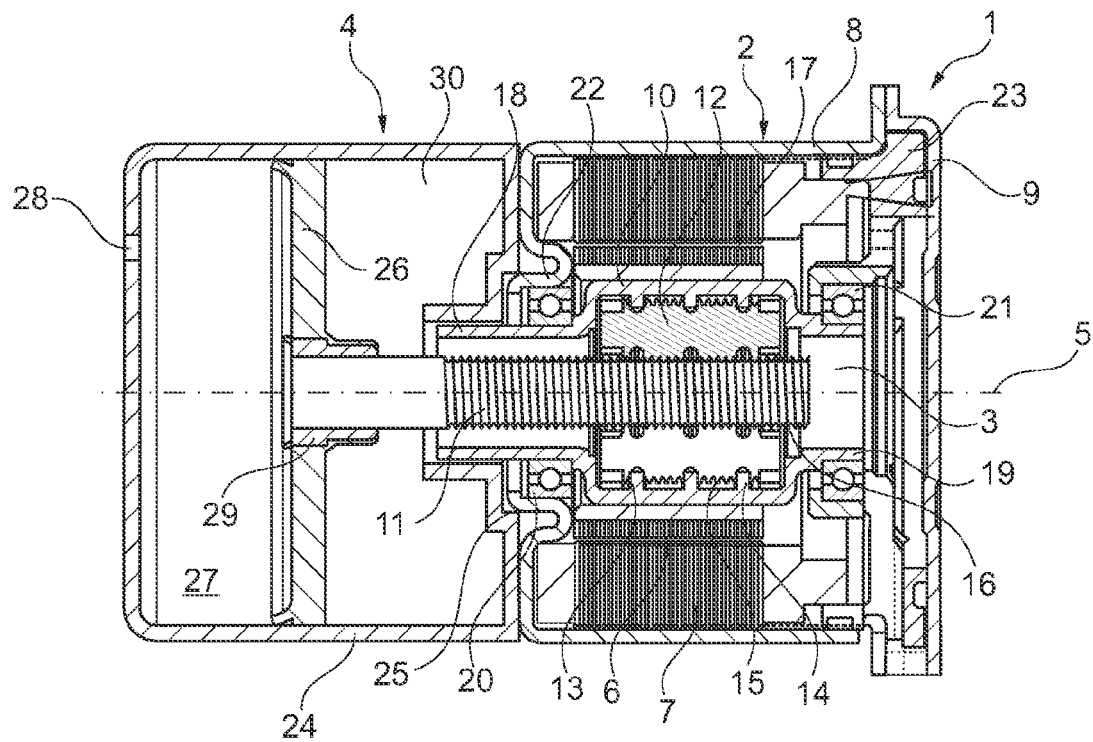
FIG. 1 is a sectional view of a hydrostatic actuator.

FIG. 1 is a sectional view of hydrostatic actuator 1, for example, a hydrostatic clutch actuator, including electric motor 2, planetary rolling-contact gear system 3, and master cylinder 4, which are arranged about axis of rotation 5 of rotor 6 of electric motor 2. Stator 7 of the electric motor in housing 8 is firmly connected to cover 9. Planetary rolling-contact gear system 3, which consists of sleeve 1., the gear spindle 11, and rolling planetary body 12 rolling off there between and distributed across the circumference and rotatably fixed to sleeve 10, is arranged radially inside rotor 6. To increase the gear ratio, planetary rolling body 12 has coarse toothing 13 meshing with interior toothing 14 of sleeve 10, and fine-pitch portions 15 rolling off on outer threading 16 of gearing mechanism spindle 11. The functioning of the planetary rolling-contact gear system 3 is described in European Patent No. 0 320 621 A1 and German Patent No. 195 40 634 C1.

In one embodiment, planetary rolling contact gearing 3 is received by rotor 6 in a coaxial way with threaded spindle 11 functionally moving in the axial direction when rotor 6 rotates. Sleeve 10 is firmly connected to rotor 6. Rotor 6 may be embodied as a conventional sheet-metal assembly that includes permanent magnets 17 and is firmly connected to sleeve 10, for example, by welding or pressing. Alternatively, permanent magnets 17 may be attached to sleeve 10 individually, for instance glued thereto, thus saving the installation space a sheet-metal assembly would require. Sleeve 10 acts as a support for planetary rolling contact gearing 3 and for rotor 6 relative to housing 8. For this purpose, sleeve 10, which is preferably made of sheet metal, has two axial lugs 18, 19 which each receive respective rolling bearing 20, 21. Rolling bearing 20 is axially fixed to housing portion 22 of housing 8; rolling bearing 21 is supported by insert 23 that is centered on housing 8. Rotor 6, including planetary rolling-contact gear system 3, is mounted from the opened side of housing 8, which is closed after installation of rotor 6 by means of cover 9.

Master cylinder 4 is firmly connected to housing 8 of the electric motor, for instance by welding, by means of housing 24, which is preferably made of sheet metal. The centering of housing 24 with respect to housing 8 may be done on centering shoulder 25. Piston 26 and housing 24 together form pressure chamber 27, which is connectable to a pressure line by means of pressure port 28 that is merely illustrated as an opening here and may be equipped with a quick-acting coupling, a screw connection or the like, depending on the desired type of connection with a pressure line. When piston 26 moves, pressure is built up in pressure chamber 27, which is preferably filled with a liquid pressure fluid. Due to this pressure, a slave cylinder connected to the other side of the pressure line is actuated and acts on a diaphragm spring, lever spring or any other operative means of a friction clutch to open or close the friction clutch, depending on the design of the friction clutch as a forcibly open or closed friction clutch.

Pressure chamber 27 is arranged on the side of piston 26 that faces away from electric motor 2 and is thus pressurized when piston 26 carries out a translatory motion. The application of pressure results from the axial displacement of threaded spindle 11, which receives piston 26 on axial guide 29. Threaded spindle 11 is fixedly connected to piston 26 in the axial direction. In the relaxed state, the pressure chamber may be connected to a non-illustrated reservoir, which may be integrated into the illustrated installation space, for instance, in clearance 30 (illustrated in dashed lines) that is formed between piston and housing 24 and remains clear when pressure chamber 27 is in the relaxed state. A corresponding connection, which may be released by piston 26 when it is retracted and may be closed when pressure chamber 27 is pressurized upon an axial displacement of piston 26 is not illustrated.

Figure 2:
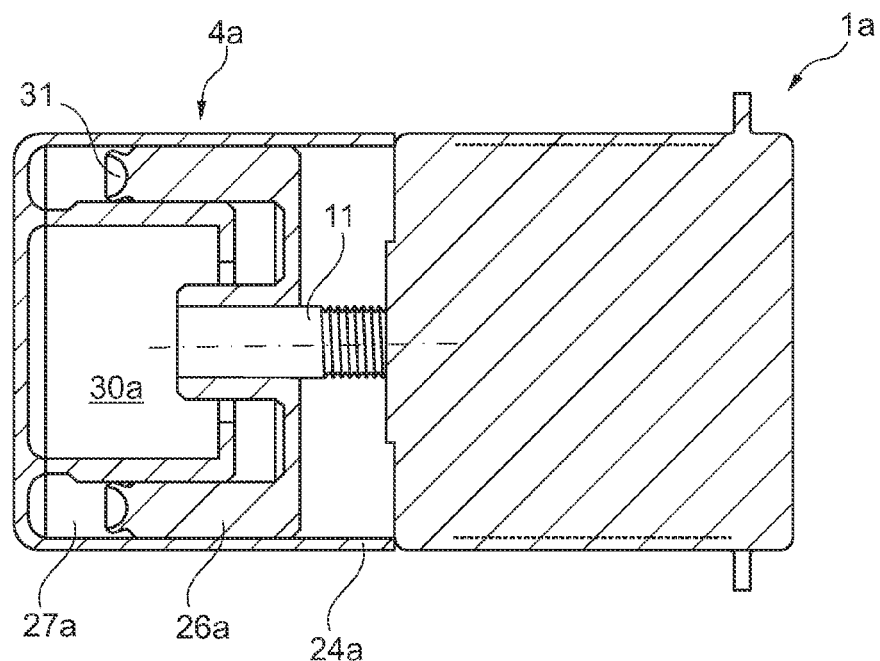
FIG. 2 is a sectional view of a hydrostatic actuator that slightly modified compared to the hydrostatic actuator shown in FIG. 1 and includes an annular piston.

FIG. 2 is a sectional view of hydrostatic actuator 1a, which differs from hydrostatic actuator 1 shown in FIG. 1 with respect to the design of master cylinder 4a. In FIG. 2, the electric motor and the planetary rolling-contact gear system are not illustrated in any detail as they essentially correspond to electric motor 2 and planetary rolling-contact gear system 3 shown in FIG. 1. In one embodiment, housing 24a of master cylinder 4a forms annular pressure chamber 27a, which is delimited by piston 26a that has corresponding annular piston surface 31. Like pressure chamber 27 of FIG. 1, pressure chamber 27a is arranged on the side facing away from the electric motor so that the operation of piston 26a occurs in the direction of the translatory movement of threaded spindle 11. A compensation reservoir may be provided in clearance 30a radially inside pressure chamber 27a.

Figure 3:
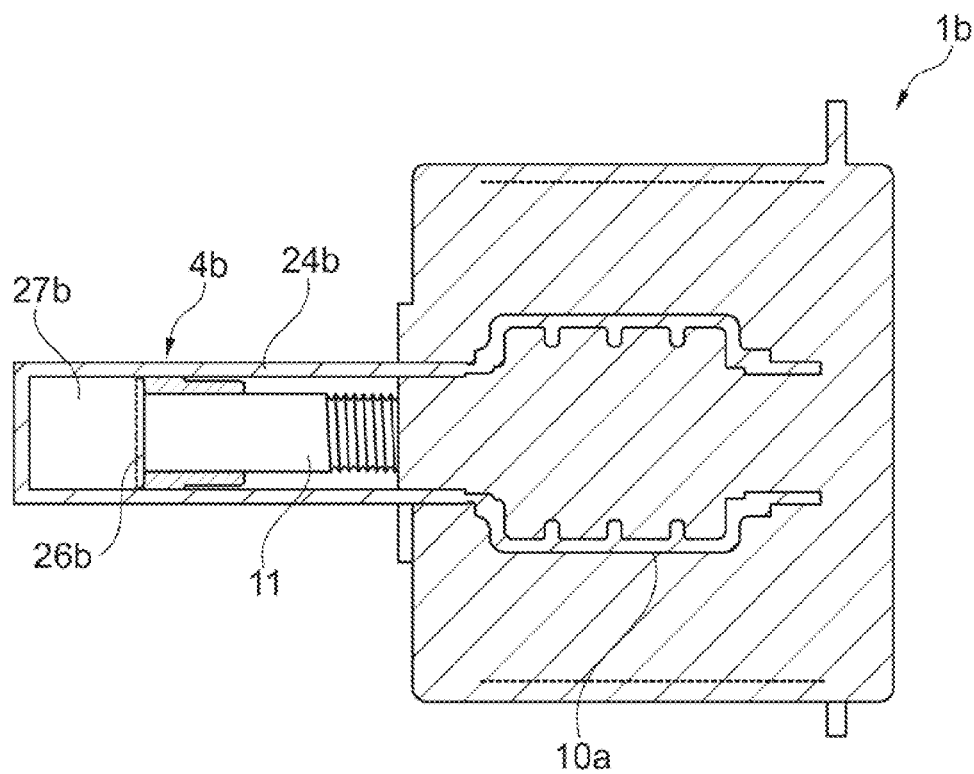
FIG. 3 is a sectional view of a hydrostatic actuator that is slightly modified compared to the hydrostatic actuator shown in FIG. 1 and includes a one-piece assembly unit comprising the housing of the master cylinder and the sleeve of the planetary rolling-contact gear system.

FIG. 3 is a partial sectional view of hydrostatic actuator 1b. In contrast to hydrostatic actuators 1, 1a of FIGS. 1 and 2, respectively, sleeve 10a of the non-illustrated planetary rolling contact gearing and housing 24b of master cylinder 4b are of once-piece construction and are preferably made of sheet-metal in a deep-drawing process, for example. At the end face of housing 24b, pressure chamber 27b, which is delimited by piston 26b, is formed. Piston 26b may be directly formed on gear spindle 11 or may be connected to the latter. The existing speed difference between piston 26b and gear spindle 11 is compensated for by the dynamic seal, which may be a seal that includes a lip seal, for example. Alternatively or additionally, a connection that is axially fixed but allows rotation may be provided between the piston and the gear spindles of the hydrostatic actuators. Moreover, the gear spindle may be arranged on a stationary housing part such as housing 24b such that it is fixed against rotation.

Figure 4:
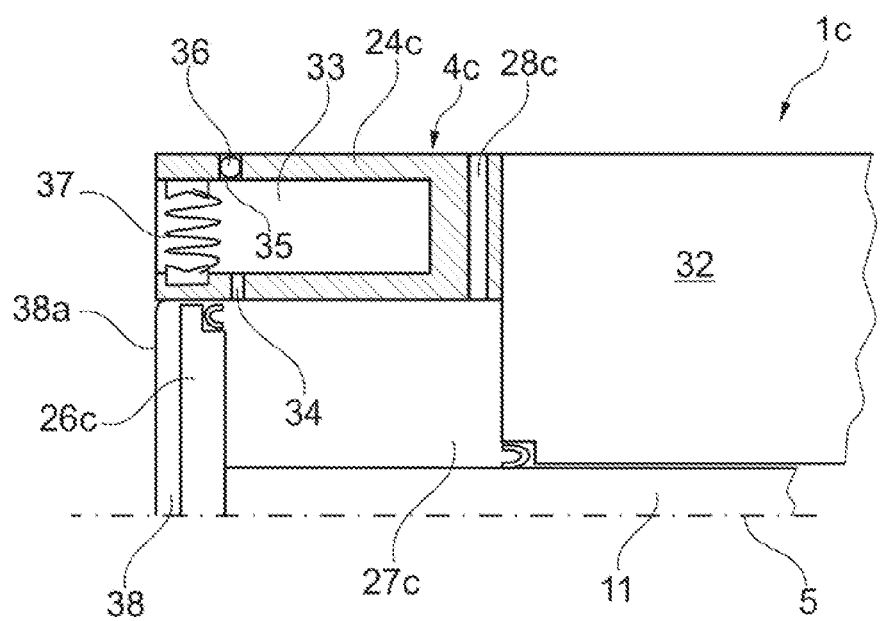
FIG. 4 is a sectional view of a portion of the hydrostatic actuator that is slightly modified compared to the hydrostatic actuator shown in FIG. 1 and includes an integrated compensation reservoir.

FIG. 4 illustrates a partial sectional view of the portion above axis of rotation 5 of hydrostatic actor 1c with master cylinder 4c that has a modified design compared to the hydrostatic actuators 1, 1a, 1b FIGS. 1 to 3, respectively. In hydrostatic actuator 1c, pressure chamber 27c, which is formed by piston 26c and housing 24c, with pressure port 28c is arranged axially between piston 26c and assembly unit 32 formed by the electric motor and the planetary rolling contact gearing. Thus, pressure is built up in pressure chamber 27c when gear spindle 11 axially displaces piston 26c in the direction of assembly unit 32. Consequently, pressure is built up in the direction of traction of piston 26c, thus loading master cylinder 4c towards assembly unit 32. This is advantageous in terms of the static design of hydrostatic actuator 1c. Reservoir 33 is integrated into housing 24c and is provided radially outside pressure chamber 27c. In the non-pressurized state of pressure chamber 27c, the volume of reservoir 33 is connected via opening 34, which may be a compensation orifice, for example, so that the pressure fluid can be compensated and air bubbles swept into pressure chamber 27c from the slave cylinder and the pressure line are transported into reservoir 33. Reservoir 33 is filled via filling opening 35, which is closed, for instance, by ball 36 as shown. Pressure compensation in reservoir 33 occurs using diaphragm 37, which is only diagrammatically illustrated and may be a bellows having axial folds. Excess pressure in reservoir 33 may compensated for, if necessary, using a non-illustrated fluid-proof opening such as a labyrinth and/or a diaphragm opening. To prevent contamination, opening 38, which is provided in housing 24c to form the pressure chamber, is equipped with cover 38a, such as a diaphragm or bellows.

Figure 5:
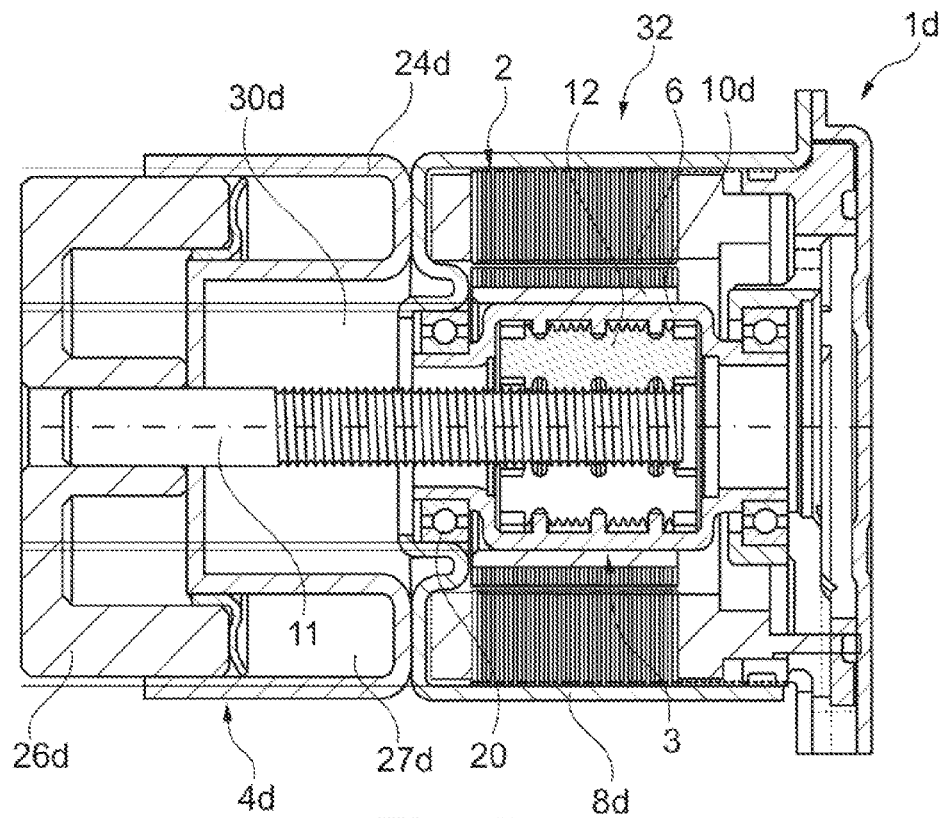
FIG. 5 is a is a sectional view of a hydrostatic actuator, including a piston drawn by a planetary rolling contact gearing.

FIG. 5 is a sectional view of hydrostatic actuator 1d that is an alternative design of hydrostatic actuator is shown in FIG. 4. Assembly unit 32 essentially corresponds to the assembly unit of FIG. 1 that includes electric motor 2 and planetary rolling contact gearing 3. Due to the fact that the piston 26d is operated in the direction of traction of gear spindle 11, planetary rolling contact gearing 3 may be axially supported against the pressure acting on pressure chamber 27d on the side of the housing, for instance, on housing 24d of master cylinder 4d so that the gearing mechanism of forces does not pass via electric motor 2. In one embodiment, when piston 26d pressurizes pressure chamber 27d, the sleeve 10d, which is firmly connected to rotor 6, is loaded axially against the stop of housing 8d, which is firmly connected to housing 24d of the master cylinder so that forces are transmitted in a closed loop from sleeve 10d via planetary roller body 12 and threaded spindle 11 into piston 26d and from there via housing 24d, housing 8d and rolling bearing 20 back to sleeve 10d. In clearance 30d, a non-illustrated reservoir may be provided radially inside the pressure chamber 27d.

Figure 6:
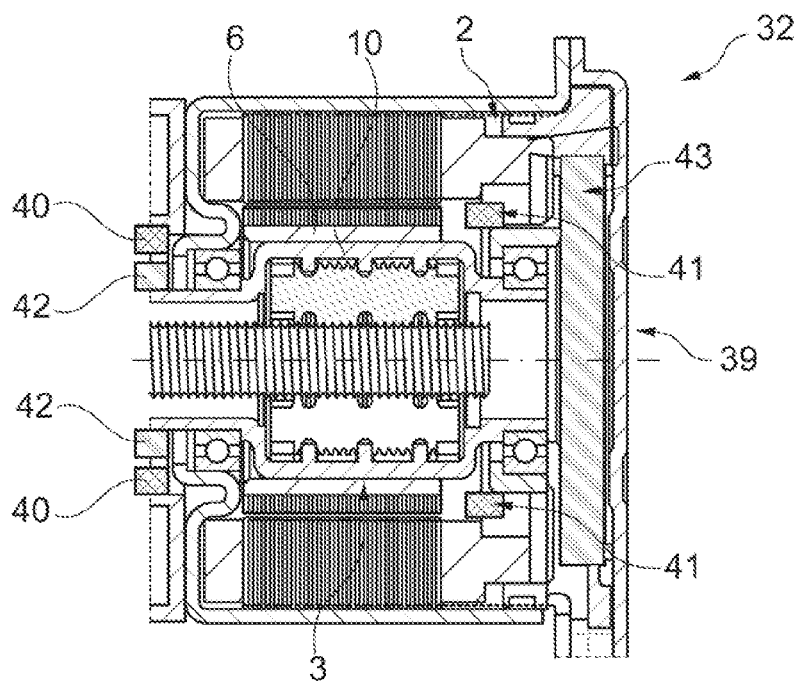
FIG. 6 is a is a sectional view of an electric motor of a hydrostatic actuator, including a sensor device in various possible positions.

FIG. 6 shows assembly unit 32 of hydrostatic actuators with electric motor 2 and planetary rolling contact gearing 3 and a possible arrangement of sensor device 39 for sensing the rotational speed of rotor 6 and sleeve 10, respectively. The illustration includes two alternative positions of sensors 40 and 41. Sensors 40, 41 may be Hall effect sensors, with sensor magnets 42 arranged on the component that rotates relative to the sensors. Sensors 40, 41 may be actively or passively operated. Local electronics 43 may be provided between sensors 40, 41 and a non-illustrated control device to create low-resistance and standardized data from the raw data obtained from sensors 40, 41 and to transmit them to the control device. Using the obtained data, electric motor 2, embodied as a brushless electric motor, may be commutated and/or the axial stroke of the piston may be determined based on the known gear ratio of planetary rolling contact gearing 3. Moreover, sensor device 39 may detect slip if planetary rolling contact gearing 3 is not of non-slip design. The slip may be evaluated in the control device and may then be compensated for. Furthermore, sensor device 39 may include a pressure sensor to sense the pressure in the pressure chamber of the master cylinder. In specific cases, a piston path measurement system may be provided.

Figure 7:
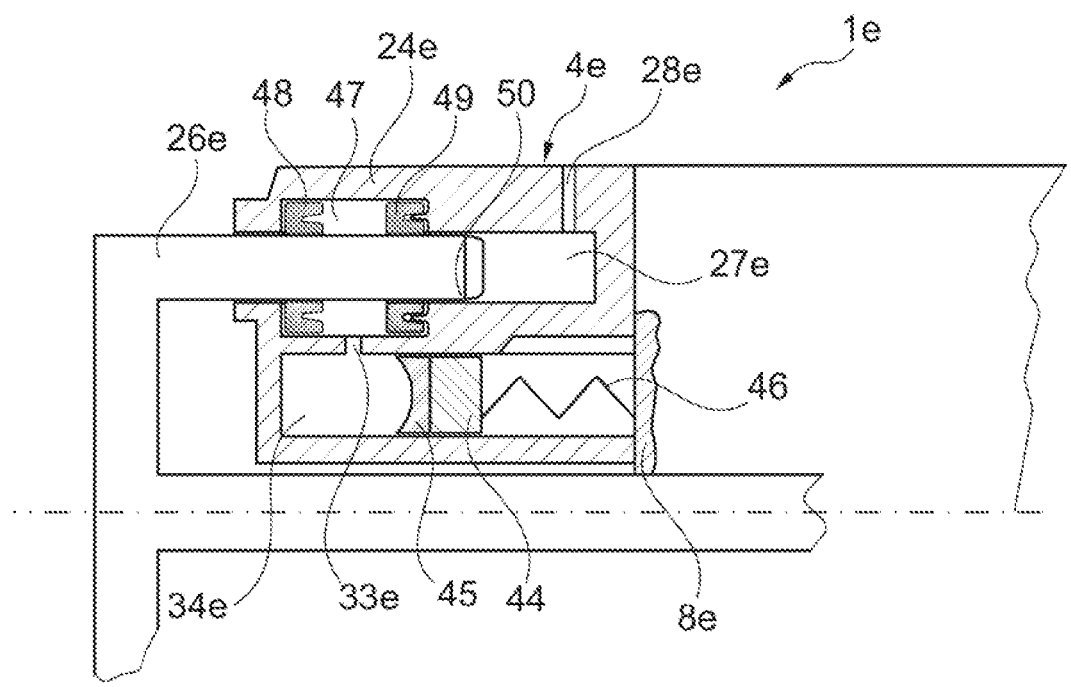
FIG. 7 is a sectional view of a portion of a hydrostatic actuator that is slightly modified compared to the hydrostatic actuator shown in FIG. 2 and includes a compensation reservoir arranged inside the pressure chamber.

FIG. 7 is a partial sectional view of a hydrostatic actuator 1e illustrated above axis of rotation 5. Hydrostatic actuator 1e is similar to hydrostatic actuator 1d shown in FIG. 5. In contrast to the latter, however, master cylinder 4e is equipped with reservoir 33e that is arranged radially inside pressure chamber 27e formed by piston 26e and housing 24e and includes pressure port 28e. Reservoir 33e is hydrostatically arranged below pressure chamber 27e so that reservoir 33e is preloaded to ensure that the pressure fluid will flow into the pressure chamber as required. For this purpose, the volume of the reservoir is preloaded by piston 44, which is equipped with seal 45. Energy storage 46, for instance, in the form of a coil spring or the like, is tensioned between piston 44 and housing 24e or housing 8e of the electric motor. Through the flow-in opening 34e the pressure fluid flows into sealing portion 47 of housing 24e in which piston 26e is sealed toward the outside by means of a seal such as grooved ring seal 48 on the one hand and relative to pressure chamber 27e on the other hand by means of a seal, such as grooved ring seal 49. If piston 26e is moved in the non-pressurized position of the master cylinder, compensation grooves 50 on piston 26e overlap the grooved ring seal 49 and provide a connection between reservoir 33e and pressure chamber 27e to allow an exchange of pressure fluid, if required.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMBERS 1 hydrostatic actuator
1a hydrostatic actuator
1b hydrostatic actuator
1c hydrostatic actuator
1d hydrostatic actuator
1e hydrostatic actuator
2 electric motor
3 planetary rolling contact bearing
4 master cylinder
4a master cylinder
4b master cylinder
4c master cylinder
4d master cylinder
4e master cylinder
5 axis of rotation
6 rotor
7 stator
8 housing
8d housing
8e housing
9 cover
10 sleeve
10a sleeve
10d sleeve
11 threaded spindle
12 planetary rolling body
13 coarse toothing
14 interior toothing
15 fine-pitch threaded section
16 exterior toothing
17 permanent magnet
18 lug
19 lug
20 rolling bearing
21 rolling bearing
22 housing portion
23 insert
24 housing
24a housing
24b housing
24c housing
24d housing
24e housing
25 centering shoulder
26 piston
26a piston
26b piston
26c piston
26d piston
26e piston
27 pressure chamber
27a pressure chamber
27b pressure chamber
27c pressure chamber
27d pressure chamber
27e pressure chamber
28 pressure port
28c pressure port
28e pressure port
29 axial guide
30 clearance
30a clearance
30d clearance
31 piston surface
32 assembly unit
33 reservoir
33e reservoir
34 flow-in opening
34e flow-in opening
35 filling opening
36 ball
37 diaphragm
38 opening
38a cover
39 sensor device
40 sensor
41 sensor
42 sensor magnet
43 local electronics
44 piston
45 seal
46 energy storage
47 sealing portion
48 grooved ring seal 49 grooved ring seal
50 compensation groove

What is claimed is:

1. A hydrostatic actuator, comprising:
a gearing mechanism;
an electric motor:
   including a stator, a rotor, and an axis of rotation for the rotor; and,
   arranged to rotate the rotor to drive a gearing mechanism spindle;
a master cylinder including a housing, a pressure chamber, and a piston that is displaceable, in an axial direction parallel to the axis of rotation, in the housing and applies pressure to the pressure chamber; and,
a compensation reservoir:
   located within the housing; and,
   an entirety of which is located inward of the pressure chamber with respect to a radial direction orthogonal to the axis of rotation, wherein:
the gearing mechanism converts a rotation of the rotor into movement in the axial direction; and,
the pressure chamber is arranged between the piston and the electric motor in the axial direction.

2. The hydrostatic actuator of claim 1, wherein the gearing mechanism is formed by a planetary rolling contact gearing comprising:
the gearing mechanism spindle that moves the piston in the axial direction and is arranged along the axis of rotation;
a sleeve that is arranged coaxially with the gearing mechanism spindle and is driven to rotate; and,
a plurality of planetary rolling bodies rolling off there between.

3. The hydrostatic actuator of claim 1, wherein the gearing mechanism is arranged radially inside the rotor.

4. The hydrostatic actuator of claim 3, wherein the rotor is supported on the gearing mechanism.

5. The hydrostatic actuator of claim 1, wherein the gearing mechanism is integrated into the rotor.

6. The hydrostatic actuator of claim 1, wherein a compensation reservoir for a hydrostatic pressure fluid is integrated into the hydrostatic actuator.

7. The hydrostatic actuator of claim 6, wherein the compensation reservoir is preloaded.

8. The hydrostatic actuator of claim 7, wherein the compensation reservoir is arranged radially outside the pressure chamber, and the pressure chamber is of annular design.

9. The hydrostatic actuator of claim 1, wherein a leakage seal is arranged between the housing and the piston.

10. The hydrostatic actuator of claim 1, wherein a sensor device for controlling the electric motor is arranged on an end face opposite an end face that receives the housing of the master cylinder.

11. The hydrostatic actuator of claim 1, wherein a sensor device for controlling the electric motor is arranged on the end face receiving the housing of the master cylinder.

12. A hydrostatic actuator, comprising:
an electric motor including a stator, a rotor, and an axis of rotation;
a gearing mechanism arranged to convert rotation of the rotor into a movement in an axial direction parallel to the axis of rotation;
a master cylinder including:
   a housing;
   a pressure chamber:
   a piston located within the housing and displaceable by the gearing mechanism in the axial direction to apply pressure to the pressure chamber; and,
   a compensation reservoir:
      located within the housing; and,
      an entirety of which is located inward of the pressure chamber with respect to a radial direction orthogonal to the axis of rotation, wherein:
the electric motor is arranged to rotate the gearing mechanism; and,
the piston is located between the pressure chamber and the electric motor in the axial direction.

* * * * *